United States Patent [19]
Busch

[11] Patent Number: 4,991,965
[45] Date of Patent: Feb. 12, 1991

[54] ELECTRO-OPTIC DEVICE FOR CONTINUOUSLY MONITORING THE RELATIVE POSITIONS OF TWO MACHINES OR PARTS THEREOF

[75] Inventor: Dieter Busch, Ismaning, Fed. Rep. of Germany

[73] Assignee: Prüftechnik Dieter Busch & Partner GmbH & Co., Ismaning, Fed. Rep. of Germany

[21] Appl. No.: 187,531
[22] PCT Filed: Jul. 20, 1987
[86] PCT No.: PCT/EP87/00395
§ 371 Date: May 11, 1988
§ 102(e) Date: May 11, 1988
[87] PCT Pub. No.: WO88/01045
PCT Pub. Date: Feb. 11, 1988

[30] Foreign Application Priority Data
Jul. 29, 1986 [DE] Fed. Rep. of Germany ....... 3625641

[51] Int. Cl.$^5$ .............................................. G01B 11/00
[52] U.S. Cl. .................................. 356/373; 356/375; 250/561
[58] Field of Search ............... 356/373, 375, 400, 141, 356/152; 250/561, 201

[56] References Cited

U.S. PATENT DOCUMENTS

| | | | |
|---|---|---|---|
| 2,703,505 | 3/1955 | Senn | 356/400 |
| 4,518,855 | 5/1985 | Malak | 356/400 |
| 4,725,738 | 2/1988 | Lysen | 356/400 |

Primary Examiner—F. L. Evans
Attorney, Agent, or Firm—Fiddler & Levine

[57] ABSTRACT

An electro-optic device for constantly monitoring the relative position of two machines or parts of machines has in a known manner a beam transmitter (10) that transmits a light beam (L) and a light receiver (11) which receives the light beam in conditions depending from the relative position of the machines or parts of machines and generates electric signals with position parameters processed in a computer from which various data partially deduced from the position parameters can be requested. An electric signal with an intensity parameter is obtained from the position parameter signals. The intensity parameter is applied in the computer (15) for cyclically requesting the data obtainable from the computer, thus allowing an easy remote operation of the data requests by arbitrarily interfering with the light beam (L) or with the reflected light beam (L').

5 Claims, 3 Drawing Sheets

ELECTRO-OPTIC DEVICE FOR CONTINUOUSLY MONITORING THE RELATIVE POSITIONS OF TWO MACHINES OR PARTS THEREOF

This invention relates to an electro-optic device for monitoring relative positions of machines or machine parts.

Electro-optic devices employing beam transmitters mounted on one machine for transmitting a light beam to a reflector on a second machine which reflects the light to a receiver producing electrical signals indicative of the relative positions of the machines are known as described in the publication WO 84/04960 and the German unexamined specification 3,419,059. The device of the former publication is suitable for monitoring the state of alignment of coupled shafts of machines, as for instance of the shaft of a drive motor and the shaft of a generator, while the latter device is generally suitable for the monitoring of the state of alignment of separately mounted machines or parts thereof.

Electro-optic devices employing beam transmitters on one machine transmitting a light beam to be reflected from a second machine to a beam receiver to monitor the mutual alignment of these machines are described for example in U.S. Pat. No. 4,518,855.

It has in the past been necessary in utilizing the signals provided by the beam receiver to employ a manual sequencing device of some known design with cyclical stepping from one unit of information to the next one in a given sequence. When selecting the switching device it was to be taken into account that the electro-optic devices frequently have to operate under critical conditions which require extensive encapsulation of all components including the electronic data processing device. Known switching devices which are particularly suitable in this connection are capacitive and inductive switches and also switches functioning like photoelectric detectors, which so far have been used in addition to other functional elements of the data processing device in a functional respect completely separately. In this case there were often difficulties, more especially when space was at a premium, in arranging on the one hand for unimpeded access and access while on the other hand not permitting unintended operation to the switching device, more especially since the manufacturer of the electro-optical devices is usually not familiar with the particular individual conditions of application.

Accordingly, an object of the invention is to provide devices which on the one hand provide unimpeded recall as desired of the information at any time while on the other hand unintentional recall of this information is excluded as far as possible while permitting a completely encapsulated manner of construction, which thus provides for substantial protection against the effects of the environment, for the components of the electro-optic system.

The effect of the features of the invention is that in the case of arbitary interruption or alternatively a substantial decrease in the intensity of the light beam at some position or other such interruption or decrease in intensity will be expressed as a charactistic of the intensity signal and the data processing system will then bring about the recall of the next information provided in the cycle. Since to insure reliable readings from the electro-optic measuring operation the user in any case has to take steps which exclude unintended interference with the path of the light beam, these measures in themselves ensure that unintended recall of information is not possible.

The use of functional elements of the measuring system provided for by the invention for the switching function furthermore means that the liability to error of the overall apparatus is substantially reduced, because a separate switching device is no longer needed, which might itself fail. It is specifically the conventional switching or circuit elements which frequently first fail in electric and electronic circuits.

The invention will now be explained in more detail with reference to the drawing of one working embodiment thereof.

Figure 1:
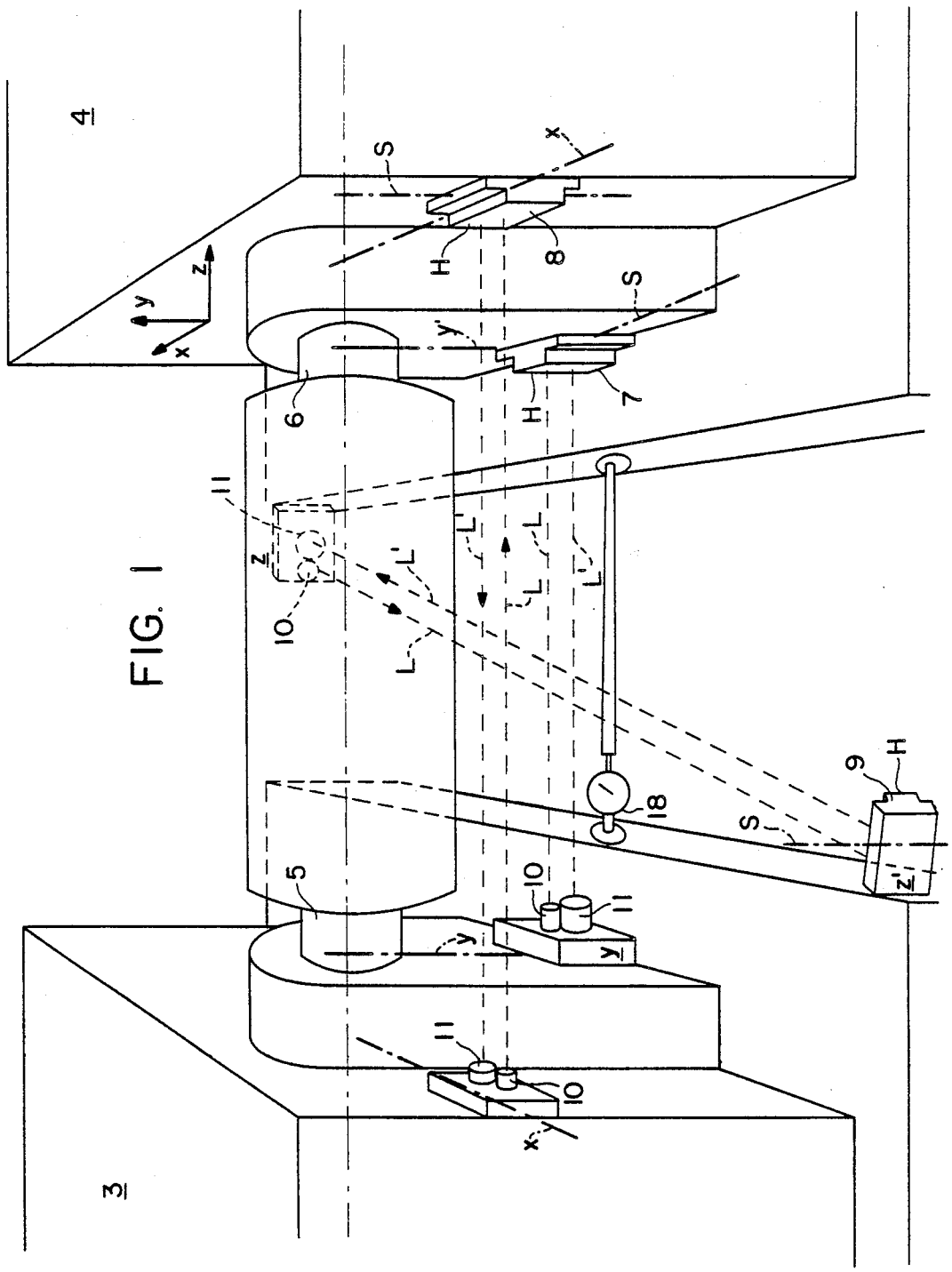
FIG. 1 shows the device in accordance with the German unexamined specification 3,419,059 as seen from the side.

In order to explain the working embodiment of the device in accordance with the invention the starting point will be a known device in accordance with the German unexamined specification 3,419,059, FIG. 1 shows this device in a side view.

In FIG. 1 it is question of machines whose relative position is to be monitored, that is to say of two separately mounted rotary machines of which one is for instance a motor and the other is for instance a generator, with coupled shaft 5 and 6. Before putting the machines 3 and 4 into operation they are so aligned in relation to each other that the shafts 5 and 6 are exactly in line with each other.

For continuously monitoring the relative position of the machine 3 and 4 in the space as defined by the spatial rectangular coordinate system X, Y and Z three prisms 7, 8 and 9 are mounted on the two machines 3 and 4 which are not described here in detail and each prism employed to monitor a different one of the three coordinate axis directions X, Y and Z to check relative skewing of the machines 3 and 4 about a desired alignment axis and parallel displacement of these machines with respect to the axial direction. For each prism mounted on one machine there is provided on the other machine a beam transmitter emitting a closely collimated light beam L generally perpendicular to the hypotenuse plane of the respective prism. Furthermore for each prism 7, 8 and 9 there is a rigidly mounted beam receiver 11 on the respectively other machine, which receives the light beam L' reflected by the associated prism and supplies a signal corresponding to the deviation of the point of incidence of the light beam from a fixed reference point in accordance with the magnitude and direction.

In the manner described in detail in the German unexamined specification 3,419,059 the light beam L inciden to the prims 7, 8 and 9 are so reflected by the latter that the point of incidence of the reflected light beam L' drifts in a generally perpendicular plane in a given direction in relation to a point of reference in the plane of measurement, when the machines 2 and 3 are angularly displaced in an axis monitored by the respective prism and that the point of incident of the light beam drifts in a direction perpendicular thereto when the two machines 2 and 3 are displaced in parallelism in the direction of the monitored axis, each of the prisms being associated with a different one of the three coordinate axes X, Y and Z.

Figure 2A:
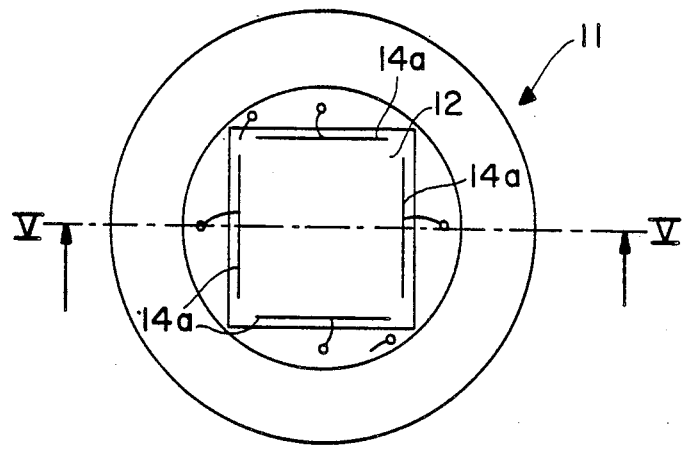
FIG. 2a is a cross section taken through the analog photoelectric semiconductor position detector, used as a beam receiver in order to indicate the functional principle.
Figure 2B:
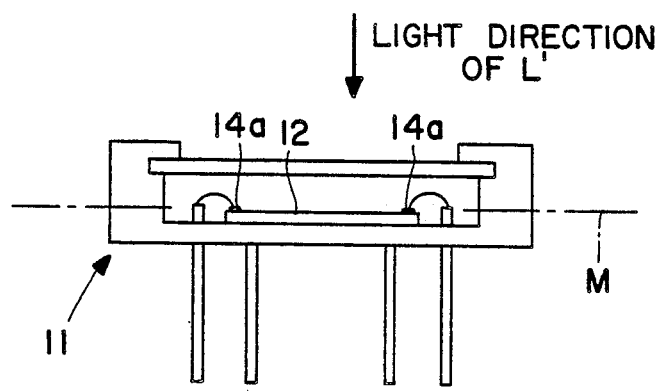
FIG. 2b shows the position detector of FIG. 2a from the front and in a dual axis design.
Figure 2C:
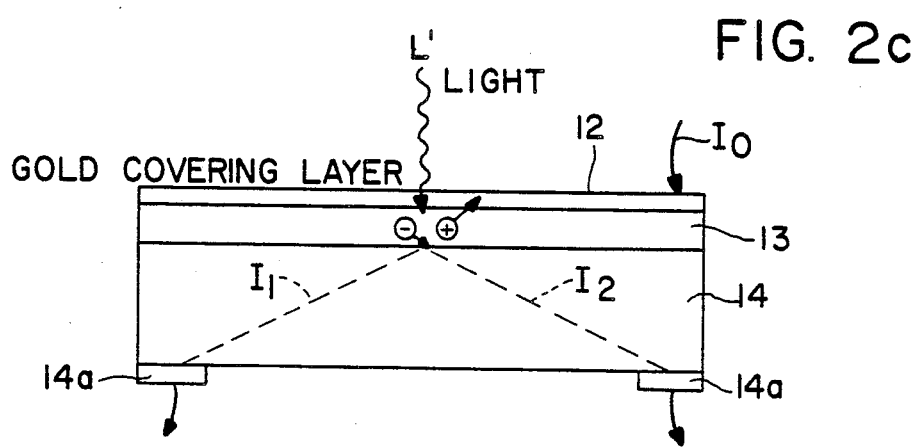
FIG. 2c is a cross section taken through the detector of FIG. 2b taken on the section line 11c—11c of FIG. 2b.

FIG. 2a through 2c show the beam receiver 11 more detail.

The beam receiver is in the form of a dual axis, photoelectric semiconductor position detector which at best seen in FIG. 2c has a covering layer 12 of gold over a depletion zone 13 overlying a high-ohmic substrate 14. The gold covering layer is supplied with a current $I_o$ and contact strips 14a are arranged on the high omic substrate 14. The division of the current $I_o$ depends on the point of light incidence, at which the reflected light beam L' strikes the gold covering layer in a generally perpendicular direction. In the design in accordance with FIGS. 2b and 2c as a dual axis position detector the supplied current $I_o$ is split up into four current fractions $I_1$, $I_2$, $I_3$ and $I_4$, which leave the system via the different individual contact strips 14a and whose magnitude depends on the distance and direction of the deviation of the point of incidence of the light beam from the center. If therefore the beam impinges exactly in the center of the square gold covering layer exactly superimposed on the depletion zone and the substrate, this preferably being made possible by suitable adjustment in the initial position of the machines 3 and 4, the four current fractions will be equal in magnitude to each other. From any current difference in the pairs, which are placed opposite to each other, of contact strips 14a it is possible to ascertain the rectangular components of the distance of an eccentric point of incidence from the center of the coordinates so that it is possible to determine any possible departure, occurring during operation, of the relative machine positions in terms of angular deviation and parallel deviation.

Position detectors of the above described type are well known and are commercially available.

The light receivers 11 in accordance with FIG. 2a through 2c are so arranged on the machine that the resolution of the vector of the deviation of the point of incidence from the null position in rectangular components is in agreement with the associated axial direction of the spatial coordinate system.

During operation the electro-optic monitoring device thus supplies continuous signals, the position characteristics, which in the present case are in the form of the magnitude of a current and define the relative position of the machines 3 and 4 in relation to the initial position and are fed to an electronic data processing device 15, which supplies continuous information concerning the alignment condition which may be recalled at an alphanumeric display or indicating device 16. By input of the machine data with respect to the precise position of the points of attachment on the foundation in relation to each other it is possible for the electronic data processig device to compute as well the type and magnitude of the corrections to be under taken at the individual support points on the basis of the signals received by the light receiver, such corrections overcoming the misalignment which has occurred and which are on call in the display device. The user is then in a position at any time to overcome a serious misalignment without further measuring operations at once by taking countermeasures as indicated by the data processing device.

It frequently occurs that in the case of separately installed rotary machines with coupled shafts it is only important to detect misalignment with respect to the axial directions, which in the present case define a plane perpendicular to a given axis, in the present case the center axis of the machine shaft. In this case only two prisms, in the case of the machine arrangement of FIG. 1, prisms 7 and 8, with the respective light transmitter 10 and the beam receiver 11 are needed. An axial deviation, which is much less serious for the operation of the rotary machines 3 and 4 in the Z direction may be detected in some other manner, as for example by means of a micrometer dial gage 18.

Input of other signals to the data processing device 15 is also possible which relate to other characteristics which are representative of the operation condition of the monitoring device 24 (conditional characteristic), from which the data processing device will then derive information concerning the operation condition for display on call on the alphanumeric display device 16. The devices 24 which supply such signals may be combined with the beam receiver 11 and be accommodated with it in a common housing.

The electronic data processing device is so adapted that in a given cycle it will then output the individual information offered by it for representation at the alphanumeric display device 16 in a certain sequence when it receives a command in this respect from information to information. This command is caused by the production of a signal which is derived from the signals supplied by the beam receiver and which contain the positional characteristics. Such signal furthermore has a characteristic representative of the intensity of light beam L' incident on the beam receiver and/or the presence or absence of the light beam. This characteristic is named the intensity characteristic, the command for the sequencing of the information display being produced when the characteristic has a value corresponding to an attenuation or absence of the light beam which is not admissible in normal operation. This value of the characteristic may be easily produced by a user, who would like to see the next piece of information, if he places an obstacle, such as his own hand, in front of the beam receiver 11 so that the beam is interrupted or at least substantially attenuated.

Figure 3:
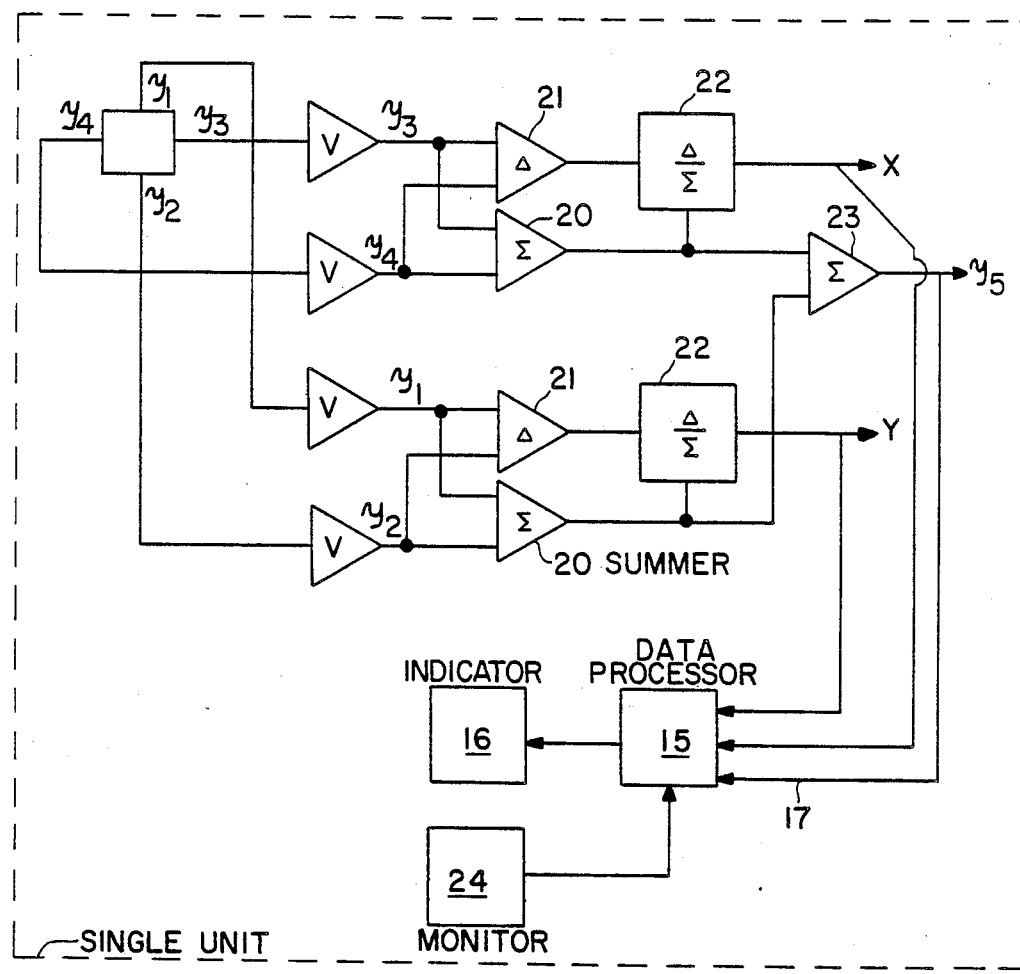
FIG. 3 shows the schematic of a circuit arrangement for producing an electrical signal with the intensity characteristic from the signals provided by the beam receiver with the position characteristics.

The signal with the intensity characteristic is formed from the signals supplied by the beam receiver 11 with the positional characteristics in the circuit shown in FIG. 3 and is supplied via the line 17 to the electronic data processing device 15 which is capable of producing the command for sequencing (i. e. stepping through the sequence) the information display on the occurrence of the respective intensity characteristic intended for this. Moreover the electronic data processing device 15 is so designed or programmed that for the next recall it offers a given first unit of information of the information able to be recalled in the cycle sequentially when the intensity characteristic keeps to its value indicating the presence of the non-attenuated light beam S' in normal operation for a given, selectable time so that after this time, during which there has been no attenuation or interruption of the light beam, on the next recall a new start is made with the first information in the cycle.

FIG. 3 is a detailed view of an embodiment of the circuit for forming signal with the intensity characteristic from signals supplied by the beam receiver 11 as in FIG. 2a through 2c with the positional characteristics, the current fractions $I_1$, $I_2$ $I_3$ and $I_4$. In the beam receiver 11 FIG. 3 only shows the four contact strips 14a.

The current fractions $I_1$ through $I_4$ coming from the contact strips 14a are supplied after amplification in an amplifier V in associated pairs $I_1$, $I_2$ and $I_3$, $I_4$ to a summating component 20 adding them and to difference-producing component 21 subtracting them. The outputs of the summating component 20 and of the difference component 21 for an associated pair of current fractions are respectively connected with the inputs of a quotient component 22, which supplies a current proportional to the quotients derived from the difference of the current fractions $I_3$, $I_4$ and $I_1$, $I_2$ and the sum of the current fractions $I_3$, $I_4$ and $I_1$, $I_2$ and corresponds to the deviation components X or Y of the vector for the deviation of the point of incidence of the light from the reference point in the plane of measurement of the light receiver 11.

The summating components 20 of the two pairs of current fractions are furthermore connected on the output side with the one and, respectively, the other input of a further summating component 23, which thus forms the sum $I_1+I_2+I_3+I_4$ and on the output side supplies the current $I_5$ proportional to this sum to the data processing device 15 as an intensity characteristic of the light beam L" to the data processing device 15. It is obvious that this intensity characteristic in the form of th current $I_5$ in normal operation of the monitoring device will have a substantialy continuous value independent of the respective deviation of the point of incident of the light beam from the null point of the light beam receiver 11, because the currents in the individual pairs thereof will be split up in a way dependent on the deviation that in the one current fraction will correspond to a substantially equal incease in the other current fraction. If the incident light beam is on the other hand attenuated to an unusual degree or is even interrupted, all the four current fractions will decrease to the same extent or may even cease completely so that in this case—and only in this case—the intensity characteristic in the form of the current $I_5$ reaches the value which produces a command for sequencing the recallable information in the data processing device 15.

In the above described manner it is possible for the individual units of information to be sequenced, i. e. presented sequentially, along the full length of the light beam L', under remote control. The beam L' may have a very great length in the case of monitoring object installed at a great distance.

I claim:

1. An electro-optic device for the continuous monitoring of the relative position in space of two machine or parts of machines, said device comprising:
   (a) a beam transmitter rigidly mounted on the one machine or the one machine part, which transmits a closely collimated primary light beam,
   (b) a reflecting system rigidly mounted on the other machine or the other machine part, respectively, which receives the primary light beam and reflects it as a secondary light beam in a manner dependent on the relative position,
   (c) a beam receiver mounted on the one machine or the one machine part, respectively, which receives the secondary light beam and produces electrical signals which characteristics dependent on the conditions of incidence thereof,
   (d) an electronic data processing device processing the electrical signals from the beam receiver, with an alphanumeric display for the recallable representation of information concerning the relative position and/or changes in the relative position and/or correctional measures for correcting changes in the relative position and possible other information derived from further input signal and/or data, and
   (e) signal deriving means electrically coupled to said beam receiver for deriving an electrical signal indicative of the intensity and position of said beam received by the beam receiver, and signal inputting means coupled to said data processing device for transmitting thereto electrical signals from said signal deriving means.

2. The device as claimed in claim 1 in which at least the machine or the machine part, which bears the beam receiver, is fixed in space characterized in that the data processing device (15) is combined with the alphanumeric display (16) and the beam receiver (11) to form a single unit.

3. The device as claimed in claim 1 characterized in that the beam receiver (11) is combined with means for monitoring the operational state of the electro-optic device, which supplies electric signals with characteristics for the operational state to the data processing device (15), which processes the latter to form corresponding recallable information.

4. The device as claimed in claim 1 characterized in that the electronic data processing device (15) is so programmed that a given unit of information is recalled as starting information for a subsequent cyclic recall of given sequence for representation on the alphanumeric display (16) when the intensity characteristic ($I_5$) has had a given value for a given length of time.

5. An electro-optic device for the the continuous monitoring of the relative position in space of two machines or parts of machines comprising:
   (a) a beam transmitter rigidly mounted on the one machine or the one machine part, which transmits a closely collimated primary light beam,
   (b) a beam receiver rigidly mounted on the other machine or the other machine part, respectively, which receives the primary light beam under conditions which are dependent on the relative position of the machines or machine parts and produces electrical signals with characteristics dependent on the conditions of incidence,
   (c) An electronic data processing device processing the electrical signals from the beam receiver, with an alphanumeric display for the recallable representation of information concerning the relative position and/or changes in the relative position and/or correctional measures for correcting changes in the relative position and possibly other information derived from further input signals and/or data, and
   (d) signal deriving means electrically coupled to said beam receiver for deriving an electrical signal indicative of the intensity and position of said beam received by the beam receiver, and signal inputting means coupled to said data processing device for transmitting thereto electrical signals from said signal deriving means.

* * * * *